(12) United States Patent
Baek

(10) Patent No.: US 7,055,997 B2
(45) Date of Patent: Jun. 6, 2006

(54) LIGHT-EMITTING DEVICE INDICATING LOCATION OF OUTSIDE DOOR HANDLE

(75) Inventor: Seung-Hyun Baek, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 219 days.

(21) Appl. No.: 10/749,249

(22) Filed: Dec. 30, 2003

(65) Prior Publication Data

US 2005/0047162 A1 Mar. 3, 2005

(30) Foreign Application Priority Data

Sep. 1, 2003 (KR) .................. 10-2003-0060717

(51) Int. Cl.
*B60Q 1/26* (2006.01)
*F21V 23/00* (2006.01)

(52) U.S. Cl. .................. 362/501; 362/100; 362/276

(58) Field of Classification Search .......... 362/100, 362/276, 394, 399, 501; 315/84; 340/426.28, 340/426.3
See application file for complete search history.

(56) References Cited

U.S. PATENT DOCUMENTS

| 2,273,570 A | * | 2/1942 | Greenlees | 362/100 |
| 3,943,352 A | * | 3/1976 | Pena May | 362/501 |
| 6,051,931 A | * | 4/2000 | Takei | 315/79 |
| 6,416,209 B1 | * | 7/2002 | Abbott | 362/501 |

FOREIGN PATENT DOCUMENTS

JP 2003-113680 4/2003

* cited by examiner

*Primary Examiner*—Y. My Quach-Lee
(74) *Attorney, Agent, or Firm*—Morgan Lewis & Bockius LLP

(57) ABSTRACT

A light-emitting device indicating a location of an outside door handle comprising a lamp, detecting part, and control part, wherein the lamp is disposed inside a pushbutton. The detecting part detects whether the engine is activated or deactivated and whether the door is opened or closed. The control part turns the lamp on when the detecting part senses that the engine has stopped running and the door has opened. The light-emitting device provides illumination to the pushbutton at the outside door handle in order for the driver, after having exited the vehicle, to easily locate the pushbutton for locking the door in the dark.

2 Claims, 3 Drawing Sheets

LIGHT-EMITTING DEVICE INDICATING LOCATION OF OUTSIDE DOOR HANDLE

CROSS-REFERENCE TO RELATED APPLICATIONS

This application claims priority to Korean Application No. 10-2003-0060717, filed on Sep. 1, 2003, the disclosure of which is incorporated fully herein by reference.

FIELD OF THE INVENTION

Generally, the present invention relates to a door handle for the outside of a vehicle door. More particularly, the door handle has a pushbutton locking mechanism with a light-emitting device inside the pushbutton.

BACKGROUND OF THE INVENTION

Typically, modern vehicles are designed to automatically open and close vehicle doors and to activate and inactivate the engine after verifying:the identity of the driver via a Personal Identification Card (PIC). Thus, when the engine stops running and the driver exits the PIC-used vehicle, the vehicle doors automatically lock after a certain period of time.

In a vehicle having a door lock with a pushbutton, the driver can manually press the pushbutton attached to the external side of an outside door handle. However, there is a drawback in conventional vehicles with pushbuttons where the outside door handle is plated with chromium and the pushbutton is typically colored in black in that the driver has a hard time finding the pushbutton of the outside door handle in the dark.

SUMMARY OF THE INVENTION

Embodiments of the present invention provide a light-emitting device in the outside door handle, wherein a lamp is turned on when the engine is deactivated and the vehicle door is opened, thereby facilitating vision of the exact location of the pushbutton of the outside handle door.

In a preferred embodiment of the present invention, a light-emitting device comprises a lamp, a first detecting part, and a control part. The lamp is installed inside a pushbutton configured to be mounted at an external side of an outside door handle. The first detecting part detects whether the engine is activated or deactivated and whether the vehicle door is opened or closed. The control part illuminates the lamp when the first detecting part detects that the engine has stopped running and the door has opened.

The light-emitting device further comprises a second detecting part for detecting the locked state of the door. The control part turns the lamp off when the second detecting part senses a locked door, thereby preventing the pushbutton of the outside door handle from emitting light once the door is locked.

BRIEF DESCRIPTION OF THE DRAWINGS

For a better understanding of the nature and objects of the present invention, reference should be made to the following detailed description with the accompanying drawings, in which.

DETAILED DESCRIPTION OF PREFERRED EMBODIMENTS

Figure 1:
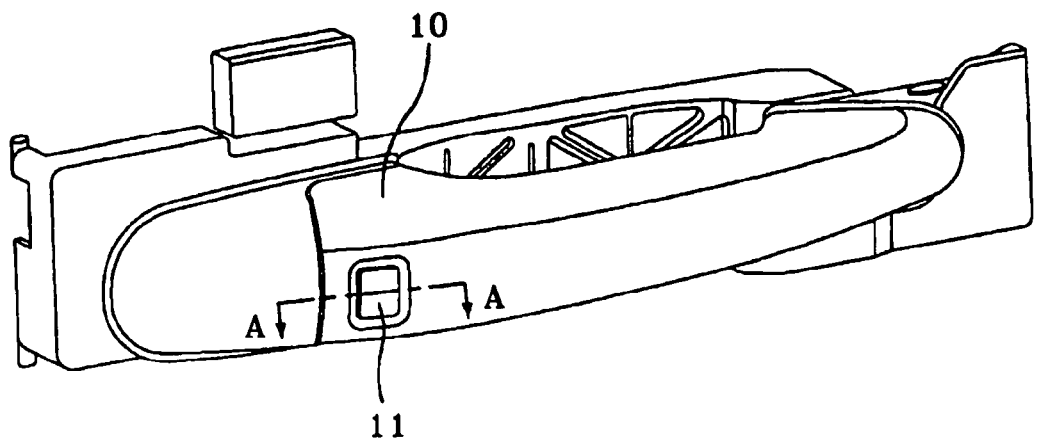
FIG. 1 is a perspective view of an outside door handle including a light-emitting device according to an embodiment of the present invention.
Figure 2:
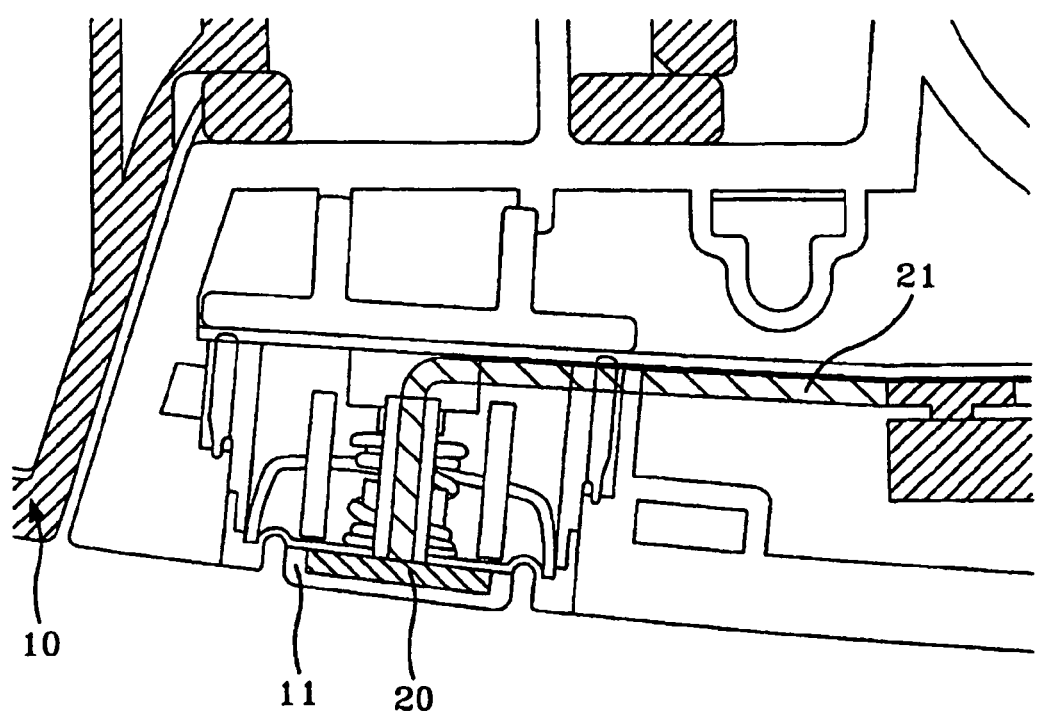
FIG. 2 is a cross-sectional view taken along line A—A of FIG. 1.
Figure 3:
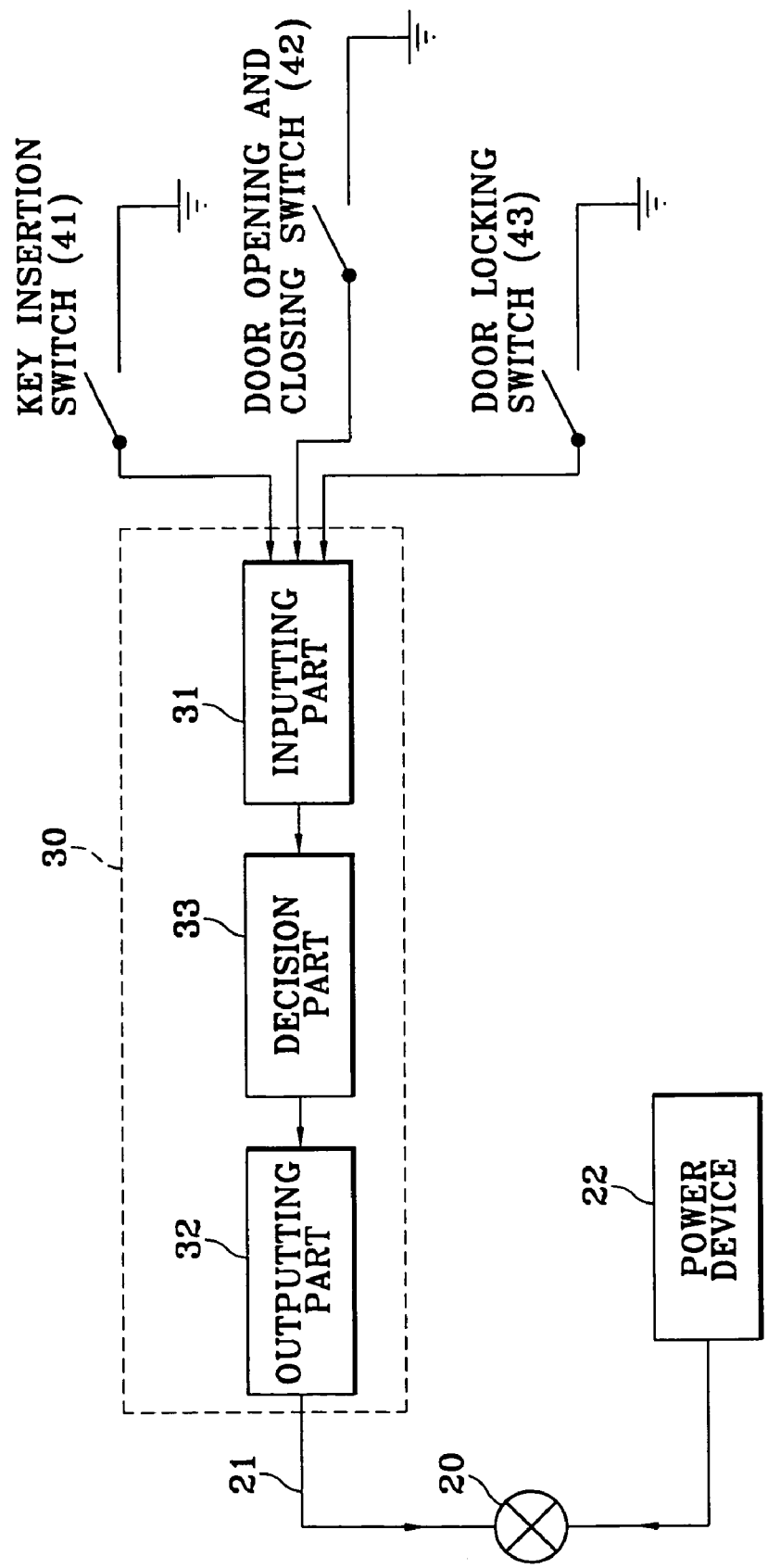
FIG. 3 is a circuit diagram of a light-emitting device indicating the location of an outside door handle according to an embodiment of the present invention.

As shown in FIGS. 1, 2, and 3, a light-emitting device indicating the location of an outside door handle comprises a lamp 20 and a control part 30, wherein the lamp 20 is installed at an outside door handle 10 and the control part 30 turns the lamp 20 on and off. The lamp 20 is disposed inside a pushbutton 11 attached to the outside door handle 10. The lamp 20 is further connected to a power device 22 and control part 30 via wire 21. The power device 22 provides a power source for the lamp 20 while the lamp 20 is turned on. According to a preferred embodiment, a Light Emitting diode (LED) bulb is commonly used as the lamp 20 for providing light to the pushbutton 11. Thus, the location of the pushbutton 11 is indicated by the lamp 20 in dark conditions.

The control part 30 includes an outputting part 32, inputting part 31, and decision part 33 as shown in FIG. 3. The outputting part 32 outputs a light-on signal or a light-off signal to the lamp 20. The inputting part 31 detects whether the engine is activated or deactivated and whether the vehicle door is opened or closed. The decision part 33 analyzes the signal inputted from the inputting part 31 and orders the outputting part 32 to output either a light-on signal or a light-off signal. A key insertion switch 41, door opening and closing switch 42, and door locking switch 43 are used to detect the on/off state of the engine and opened/closed state of the vehicle door.

The operation of the light-emitting device indicating a location of the outside door handle according to the present invention will now be described.

Figure 4:
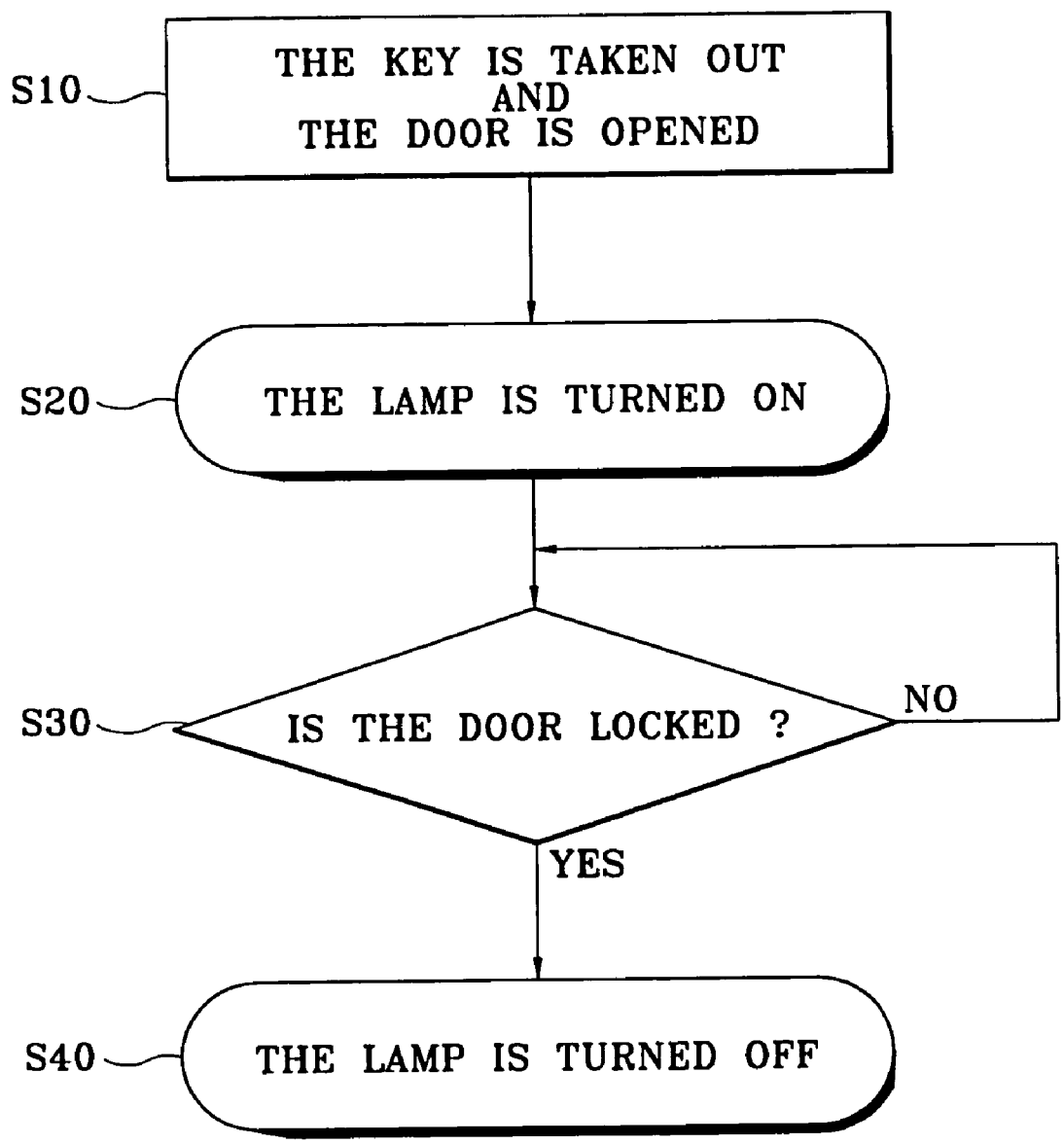
FIG. 4 is an operational method of a light-emitting device indicating the location of an outside door handle according to an embodiment of the present invention.

With reference to FIGS. 3 and 4, if the engine stops running, the key insertion switch 41 is turned off, and if the driver opens the door to exit the vehicle, the door opening and closing switch 42 is activated. The inputting part 31 detects the status of key insertion switch 41 and door opening and closing switch 42 and inputs this information to the decision part 33 (step 10). The decision part 33 outputs a light-on signal to the lamp 20 through the outputting part 32 when the engine is stopped and the door is opened. The location of the pushbutton 11 at the external side of the outside door handle 10 is indicated by turning on the lamp 20 (step 20), thus allowing the driver to easily locate the pushbutton 11 in the dark to lock the door.

When the driver pushes the pushbutton 11, the door locking switch 43 is turned on. The inputting part 31 of the control part 30 continuously detects the state of the door locking switch 43, and once the door locking switch 43 is turned on, the inputting part 31 inputs this information to the decision part 33 (step 30). If it is determined that the door locking switch 43 is turned on, the decision part 33 outputs a light-off signal through the outputting part 32 to the lamp 20 for turning off the lamp 20. Provided that the door is locked, the lamp 20 is turned off (step 40).

As apparent from the foregoing, there is an advantage in that the light-emitting device indicating a location of an outside door handle includes a lamp inside the pushbutton for being turned on when the engine stops running and the door is opened. A control part detects whether the engine is activated or deactivated and whether the vehicle door is open or closed for outputting a light-on signal to the lamp while the engine is deactivated and the door is opened and for outputting a light-off signal to the lamp when the door is detected to be in a locked state, thereby allowing the driver to easily locate the light-emitting pushbutton in order to lock the vehicle door.

What is claimed is:

1. A light-emitting device of an outside door handle of a vehicle, comprising:
   a lamp disposed inside a pushbutton attached to an external side of the outside door handle;
   a first detecting part for detecting whether an engine is activated or deactivated and whether a vehicle door is opened or closed; and
   a control part illuminating said lamp when said first detecting part detects that the engine has stopped running and the door has opened.

2. The device as defined in claim 1, further comprising a second detecting part for detecting a locked state of the vehicle door, wherein said control part turns said lamp off when said second detecting part senses that the vehicle door has locked.

* * * * *